(12) United States Patent
Briscoe

(10) Patent No.: US 6,341,273 B1
(45) Date of Patent: Jan. 22, 2002

(54) ELECTRONIC COIN STICK WITH POTENTIAL FOR FUTURE ADDED VALUE

(75) Inventor: Robert J Briscoe, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/066,337

(22) PCT Filed: Mar. 23, 1998

(86) PCT No.: PCT/GB98/00883

§ 371 Date: Apr. 29, 1998

§ 102(e) Date: Apr. 29, 1998

(87) PCT Pub. No.: WO98/43211

PCT Pub. Date: Oct. 1, 1998

(30) Foreign Application Priority Data

Mar. 26, 1997 (EP) ............................................. 97302098

(51) Int. Cl.[7] ........................... G06F 17/60; H04K 1/00; H04L 9/00
(52) U.S. Cl. ............................. 705/41; 705/39; 705/78; 713/176
(58) Field of Search ........................... 713/176; 705/41, 705/39, 78

(56) References Cited

U.S. PATENT DOCUMENTS

| | | | |
|---|---|---|---|
| 5,267,314 A | | 11/1993 | Stambler |
| 5,872,844 A | * | 2/1999 | Yacobi ......................... 380/24 |
| 5,952,638 A | * | 9/1999 | Demers et al. .............. 235/379 |
| 5,956,404 A | * | 9/1999 | Schneier et al. .............. 380/25 |
| 6,021,399 A | * | 2/2000 | Demers et al. ................ 705/39 |

FOREIGN PATENT DOCUMENTS

| | | |
|---|---|---|
| EP | 0496656 A1 | 7/1992 |
| EP | 0507669 A1 | 10/1992 |
| EP | 0518365 A2 | 12/1992 |
| EP | 0542298 A2 | 5/1993 |
| WO | WO 97/03423 | 1/1997 |

OTHER PUBLICATIONS

Security Protocols, International Workshop Proceedings, "NetCard—A Practical Electronic–Cash System" —1996, pp. 49–57, R. Anderson et al.

Security Protocols, International Workshop Proceedings, "PayWood and MicroMint" Two Simple Micropayment Schemes, 1996, pp. 68–87, Rivest et al.

Schneier, Bruce, Applied Cryptography, 1996, p. 53.*

Pedersen, Torben P., "Electronic Payments of Small Amounts", Computer Science Department, Aarhus University.*

Hauser, Ralf, Michael Steiner, Michael Waidner, "Micro–Payments based on iKP", Jan. 16, 1996, Information Technology Solutions Department, IBM Research Division.*

* cited by examiner

Primary Examiner—Gail Hayes
Assistant Examiner—Douglas J. Meislahn
(74) Attorney, Agent, or Firm—Nixon & Vanderhye P.C.

(57) ABSTRACT

In a digital payment transactions system, a broker generates and stores a secret number. The broker then generates a chain of hash values by successive operations of a hash function, using the secret number as the starting value. The broker then issues to the user a digitally encoded value from some way down the chain of hash values. The user generates a coin stick which comprises a chain of hash values starting with the value communicated by the broker. Subsequently, the broker can transfer further value to the user, without generating a new coin stick, by communicating a digitally encoded value from the broker's hash chain which precedes the value originally communicated to the user.

26 Claims, 3 Drawing Sheets

US 6,341,273 B1

ELECTRONIC COIN STICK WITH POTENTIAL FOR FUTURE ADDED VALUE

BACKGROUND OF THE INVENTION

1. Field of the Invention

The present invention relates to a digital payment transaction system.

2. Related Art

With the growth and commercialisation of the Internet, there has been an increasing need for technologies to allow payments to be made on-line. For transactions of relatively high financial value this need is adequately met, for example, by systems using electronic cheques issued by a trusted party such as a bank. Such electronic cheques are typically validated by a signature which is encrypted using a public key algorithm. There is however a significant computational overhead associated with the use of such algorithms. Therefore, just as in real life a cheque is unlikely to be acceptable for a purchase of small value because of the associated transaction costs, so also in electronic commerce, electronic cheques are not suitable for payments of low value.

A number of proposals have been made for alternative transaction systems suitable for making the so-called "micropayments" required by low-value transactions. One promising approach uses a chain of hash functions to generate a series of digital payment tokens from a secret random or pseudo-random number. A series of digital payment tokens which is generated in this way is known as a coin stick. The hash function is a transformation which takes a variable size input m and returns a fixed length string h which is termed the hash value. When used for cryptographic purposes, such as the payment system of the present invention, the hash function is chosen to be a one-way function: that is to say, given a hash value h it is computationally infeasible to work out the input value m.

SUMMARY OF THE INVENTION

According to a first aspect of the present invention, there is provided a method of operating a digital payment transaction system comprising a) at a first party, ("the broker") generating a digitially encoded secret number b) storing at the first party the secret number c) communicating to a second party ("the user") the digitally encoded secret number, or a number derived therefrom d) generating a hash chain of values which are derived from the secret number e) communicating digitally encoded values from the hash chain from the second party to a third party ("the vendor") in payment, which third party is selected from a multiplicity of potential vendors.

The first aspect of the present invention provides for the first time a method of using a coin stick between three or more parties. This greatly increases the flexibility in operation of the transaction system, and makes it suitable, for example, for use in on-line trading with a multiplicity of vendors.

In operation, the user may be issued with the secret random number by a bank. This forms the beginning of the hash chain. The user then uses a publically known hash function to operate on the serial number to produce a first hash value, and then operates on the first hash value with the hash function to produce a second hash value, and so on. The process is repeated a set number of times, say ten times, to produce a number of hash values corresponding to a number of units, each having a predetermined value. To transfer a payment, for example to a vendor who operates an on-line service, the user communicates to the vendor the value at the end of the hash chain, that is in this example the result of the tenth hash operation. The vendor validates this value by returning it to the issuing bank. Using the hash function, the bank checks that the value is that expected for the tenth hash value generated from the relevant random secret number. The bank confirms to the vendor the validity of the value. Then if the user wants to transfer, for example, three units of value, it communicates to the vendor the hash value three steps back along the hash chain, that is, in this example, the result of the seventh of operation of the hash function. The vendor is now able to validate this hash value without further communication with the bank, simply by operating on the transferred hash value with the hash function. The one-way nature of the hash function ensures that the vendor, despite knowing the value at the end of the chain, is not able to generate values preceding those which have been transferred by the user.

According to a second aspect of the present invention, there is provided a method of operating a digital payment transaction system comprising a) at a first party, ("the broker") generating a secret number b) storing at the first party the secret number c) generating at the first party a first hash chain of values which are derived from the secret number by successive operations of a hash function d) communicating to a second party ("the user") a digitally encoded value from the chain of hash values e) generating at the second party a second hash chain of values which are derived from the value communicated by the first party in step (d)

f) communicating digitally encoded values from the said second hash chain to a third party ("the vendor") in payment g) subsequently communicating to the second party from the first party a value in the said hash chain which precedes the value originally communicated in step (d).

This aspect of the present invention provides a transaction system in which, despite the one-way nature of the hash function, value can be transferred to the user of an existing coin stick, as well as value being transferred from the user. This makes it possible, for example, for a vendor to make a refund to the user, without it being necessary for the user to have a merchant relationship with a bank. Alternatively this capability can be used to top up a coin stick following further payment to the bank by the user without incurring the processing and communication overheads which would be associated with the generation of a new coin stick. The value potentially available to the user is effectively determined by the difference between two values held as two pointers, one at the party that issues the coin stick (termed "the broker") and one at the user, rather than being determined by a single pointer which corresponds simply to the number of unspent values in the hash chain. The value actually available at any instant corresponds to the difference between the highest pointer held by the user and the highest sofar revealed to a vendor. To refund value to the user, the vendor agrees with the broker to forgo its right to some of the value it has revealed to the broker, the broker moves its pointer, which corresponds to the value revealed to the user back down the hash chain, and issues to the user a value which precedes the hash value which was originally communicated in step (d). This results in there being additional units of value which are available to the user for payment to the vendor.

Preferably the payment transaction system is a pre-paid system in which, in step (d), the value from the hash chain is issued in return for payment by the second party to the first party.

Preferably at least two of the first, second and third parties are all located remotely from each other, and digitally encoded hash values are communicated between the parties via a communications network which links the parties. Preferably the communications network uses Internet protocols.

As discussed in the introduction above, the present invention particularly addresses the needs of on-line trading, for example over the Internet. As a result of the reduced communication overheads which it offers, its use is particularly advantageous in this context. The invention is not however limited to use in this way and might also be used, for example, in transactions carried out with a payment card and an electronic terminal which reads the payment card.

According to a third aspect of the present invention there is provided a payment server for use in a digital payment transaction system, comprising:

a) means for generating a secret number;

b) a store for storing the secret number;

c) means for generating a chain of hash values from the secret number by successive operations of a hash function;

d) means for issuing to a user a value from the said chain of hash values; and e) means responsive to a request from the user or from another party for issuing to the user another value from the said hash chain of values which precedes the value originally issued in step (d).

According to a fourth aspect of the present invention there is provided a method of operating a digital payment transaction system including issuing to a user a plurality of different hash chains corresponding to different monetary denominations. This aspect may advantageously be combined with the method of one or more of the other aspects of the invention, but may also be used independently of those other aspects.

According to a fifth aspect of the present invention, there is provided a method of operating a digital payment transaction system comprising a) at a first party, ("the broker") generating a digitially encoded secret number b) storing at the first party the secret number c) communicating to a second party ("the user") the digitally encoded secret number, or a number derived therefrom d) generating a hash chain of values which are derived from the secret number e) communicating digitally encoded values from the hash chain from the second party to a third party ("the vendor") in payment, which third party is selected from a multiplicity of potential vendors;

f) subsequently selecting another one of the multiplicity of potential vendors and communicating one or more further values from the hash chain generated in step (d) to the said other one of the multiplicity of potential vendors.

This aspect of the invention may be combined with the preceding aspects, but may also be used independently of them. It enhances the flexibility in use of the coin sticks by allowing the user to switch between different vendors. It is particularly preferred that when the switch between users takes place, that the responsibility for alerting the broker should lie with the new vendor.

Preferably the number of potential vendors available for selection is greater than or equal to 500, and more preferably is greater than or equal to 1000.

Another significant feature of the present invention is its scalabilty to large scale systems with many vendors.

BRIEF DESCRIPTION OF THE DRAWINGS

Systems embodying the present invention will now be described in further detail, by way of example only, with reference to the accompanying drawings in which.

DETAILED DESCRIPTION OF EXEMPLARY EMBODIMENTS

Figure 1:
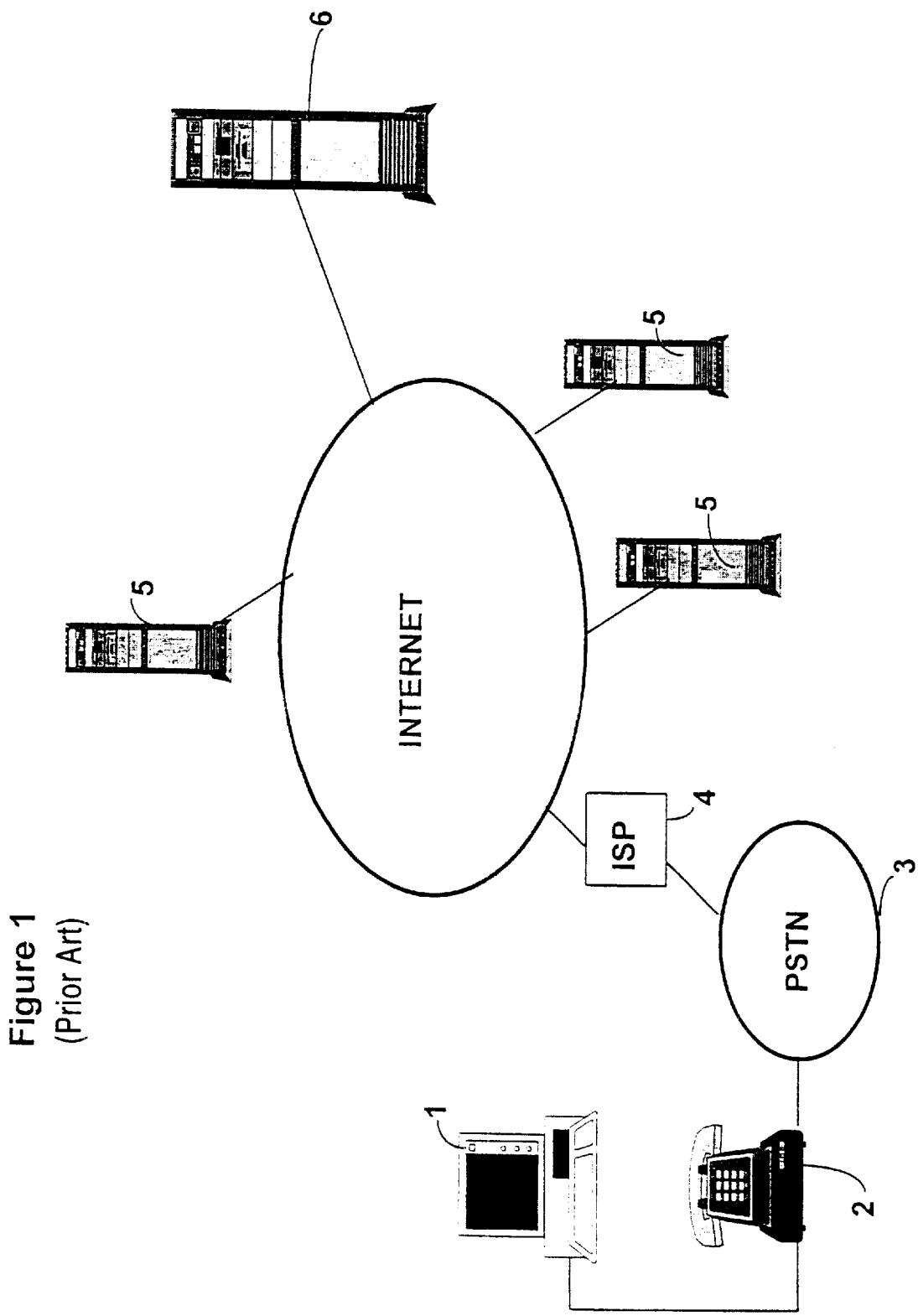
FIG. 1 is a schematic of a network embodying the invention.

As shown in FIG. 1, a client terminal 1, which in this example is a personal computer, is connected via a modem 2 and the PSTN (public switched telephony network) 3 to an Internet Service Provider (ISP) 4. Via the Internet, the client terminal forms, at different times, connections to a broker 6 who operates a payment server and to one or more of a number of on-line vendor 5. The vendors 5, in this example offers a service for payment. For example the vendor may serve pages of personalised news items using HTTP (hypertext transfer protocol) at low charges per page.

Figure 2:
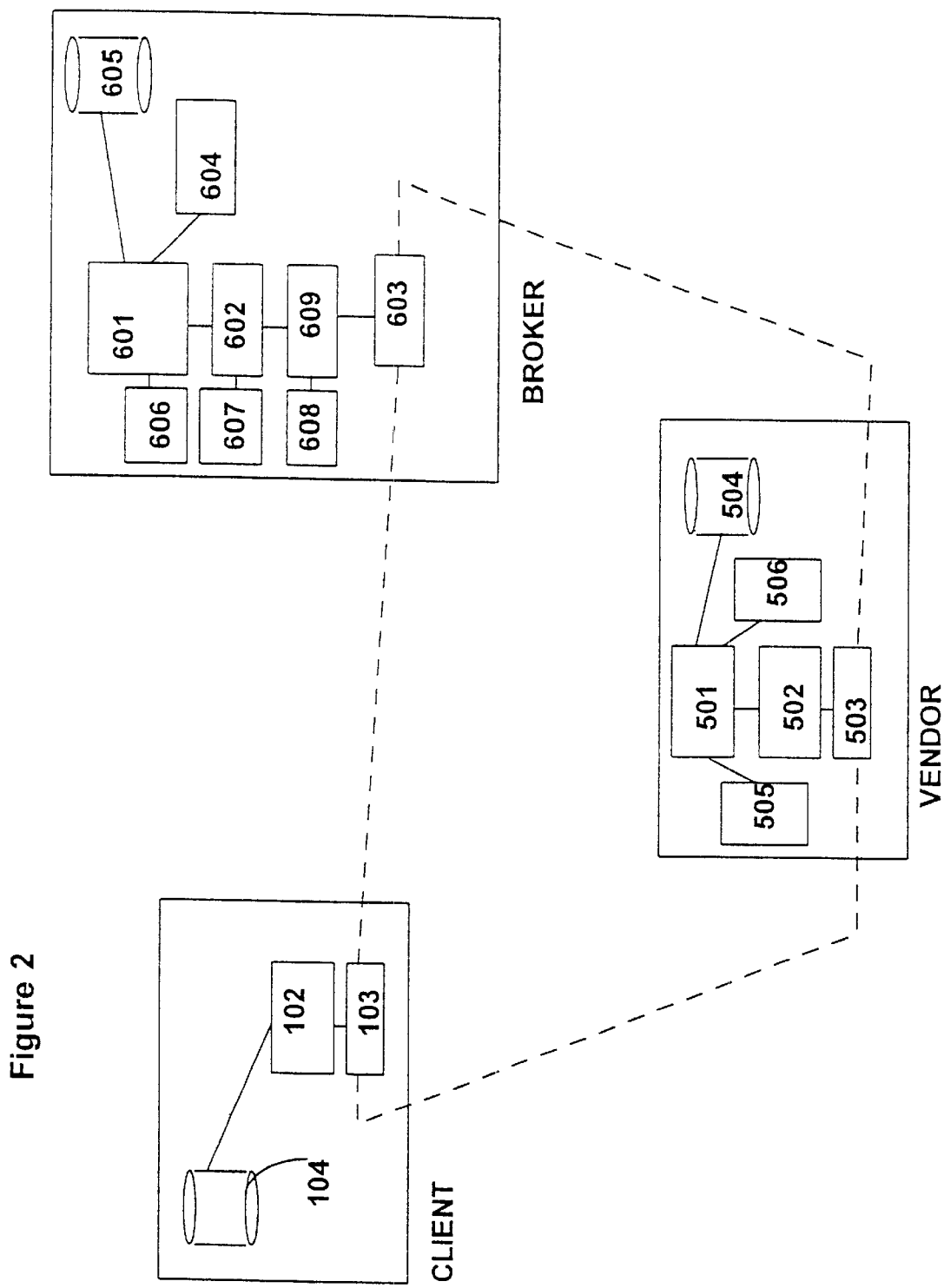
FIG. 2 is a diagram showing in further detail the components of the network of FIG. 1.

The client terminal runs a Web browser application, such as Microsoft Corporation's Internet Explorer (trademark). A payment application is run in conjunction with the web browser as a plug-in or helper application. At the broker 6 the payment server runs on an appropriate platform, in this example a UNIX workstation. FIG. 2 shows in further detail the structure of the client payment application, of the payment server and of the vendor. The client payment application comprises a payment module 102, a messaging module 103, and a local data store 104. The payment server comprises a coin stick issue module 601, a verifier module 602, a messaging module 603, and a settlement module 609. A random number generator 604 is connected to the coin stick issue module 601. A local data store 605 stores data about coin sticks which have been issued to users. The vendor includes a payment transaction module 501, a verifier module 502 and a messaging module 503. A data store 504 at the vendor, stores digital payment tokens which have been received from the user. The broker offers three interfaces for incoming requests: a coin stick issuing interface 606, an authorisation interface 607 and a settlement interface 608. The vendor offers two interfaces for incoming requests, a payment interface 505 and a call-back interface 506.

In use, the client 1 first contacts the broker and purchases a coin stick. Subsequently the client 1 contacts the vendor 5. When the client wishes to make a purchase the transfer a value from the coin stick to the vendor. The vendor 5 communicates with the broker 6 to verify the validity of the end-value derived from the value received from the client 1. The validity is confirmed to the client, and the purchase of, e.g., HTTP pages then goes ahead. The vendor 5 stores values which are received from the client 1. Vendor 5 subsequently returns the received values to the broker 6. The payment transaction is completed by the broker 6 then paying the vendor 5 accordingly. The vendor 5 may also contact the broker 6, and request that a refund be made to the client 1.

If at any time the bank says the stick is valid, but the vendor tells the client it isn't, even though the broker has taken a coin off the stick, the client has redress because it can prove the broker said it was valid (because the broker is trust-worthy).

The different stages outlined above will now be described in further detail.

Figure 3:
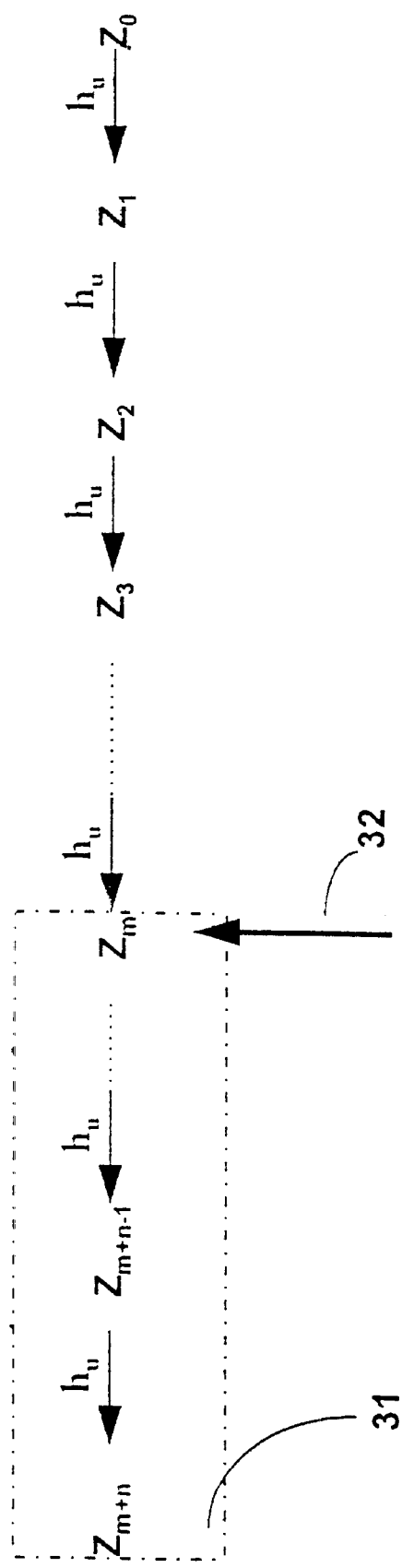
FIG. 3 is a diagram showing a chain of hash functions used in the generation of a coin stick.

The client 1 initially contacts the broker 6 by accessing, using the Web browser, an Internet URL (uniform resource locator) which corresponds to the interface 606 of the coin stick issue module 601 of the broker 6. The coin stick issue module 601 executes a CGI (Common Gateway Interface) script which accepts and processes data from the user, and establishes a digitally signed contract with the user, as will be further described. The client requests from the broker 6 a coin stick of a specified value, say £10 and in a specified denomination, say 10p. The client pays the broker for the coin stick, for example by communicating in encrypted form the user's credit card number. Alternatively, because the present invention preserves anonymity, an anonymous payment method such as Mondex (Trademark) could be used. In response, the coin stick issue module reads from the random number generator 604 a 160 bit value $z_0$. As shown in FIG. 3, the coin stick issue module operates on this value $z_0$ with a hash function to produce a hash value $z_1$, operates on $z_1$ with the hash function to produce a further hash value $Z_2$, and so on. The processing with the hash function is iterated a predetermined number of times, for example 50 times, and the resulting value $z_m$ is issued to the client 1, to form the basis of the coin stick. The broker stores a pointer which records the position m in the hash chain of the value issued to the client 1. (The term "pointer" is used in this specification broadly to denote an index value or similar stored indicator. It is by no means limited to a pointer as implemented in programming languages such as C++ which employ what is termed "pointer arithmetic"). The value $z_m$ may be encoded for transfer to the client 1, for example using a public key algorithm such as RSA dual key. The value $z_m$ is issued bound in a digitally signed contract. In this example, the contract includes the following data:

$v_0$, the coin stick value
$d_u$, the coin stick denomination
$h_u$, the hash function
i, a coin stick identifier, unique within the broker
$URL_A$, the address of the broker's authorisation interface.

All these data, apart from the value $z_m$, may be communicated publicly, without encryption. However, it is desirable to make the message tamper proof, if not private. It is important for security that interface identifiers intended for later use are packaged with an initial message that is known to be trusted, rather than allowing anyone to assert the existence of a spoof interface in a message which cannot be proved to have come from the correct party. The hash function may be any one of a number of cryptographic hash functions in common use. Appropriate hash functions include those known as SHA1 and $RIPE_{-MD}(160)$. Both the hash function and the denomination need not be directly communicated in each message but may be implied by reference to a standard protocol name, however, including the hash function and the denomination explicitly in each message makes it easier to upgrade the protocol should the need arise due to monetary inflation or due to mathematical compromise of the hash function.

The contract between the broker and the client stipulates that once any coin on the coin stick has been revealed to any vendor, the liability on the bank's part to refund the value beyond that coin transfers from being a liability to pay the user, to a liability to pay the vendor. The user is therefore able to transfer monetary value to a vendor by revealing values from the coin stick.

Having purchased the coin stick from the broker, the client 1 subsequently accesses the Web site of the vendor. In this example, the client 1 requests access to a number of pages of personalised news information under different headings and each conforming to a profile corresponding to the particular interests of the user. The transaction module 501 in the vendor calculates the total price of the requested pages, $v_p$, and requests a prepayment of this value from the client 1 into its payment interface. The payment interface may be located at the vendor and operated under the direct control of the vendor. Alternatively, the vendor may subcontract the payment operation to another party, in which the payment interface is operated under the control of that sub-contractor. The payment module 102 in the client 1 first calculates the length n of the original coin stick in terms of numbers of iterations of the hash function, where $n=v_0/d_u$. It then calculates the number of iterations made unnecessary by the first payment, $p=v_p/d_u$. A corresponding number n–p of hash values are repeatedly calculated, starting with the secret value $z_m$ provided by the broker. The value $z_{m+n-p}$ at the end of the resulting hash chain is communicated to the vendor, along with $d_u$, $h_u$, i and $URL_A$. Either or both of $d_u$, $h_u$ may be implied by reference to a standard protocol name.

In the next stage, the vendor also calculates p and runs this many more hash functions on the hash value $z_{m+n-p}$ to arrive at the value $z_{m+n}$. The vendor connects to the broker's authorisation interface at $URL_A$, passes the broker its callback interface, $URL_C$ and requests confirmation that $z_{m+n}$ is the value at the length of the coin stick with identity i issued to the client. The broker checks its stored data, and compares the value of $z_{m+n}$ communicated by the vendor with the expected value for the end of the coin stick i by running the same hash sequence. If these values match, then the broker replies to the vendor confirming that it will honour payments made with this coin stick, up to the value $v_0$, on its settlement interface $URL_S$. If the user has tried to defraud the bank, by increasing the length and hence the value of the coin stick, for example to $z_{m+n+1}$, then the bank refuses the transaction at this point.

At this stage, the vendor can disconnect from the broker. The vendor now delivers the goods to the client.

Subsequent requests for goods then require the payment module 102 to calculate the number of units of the coin stick denomination which are required to match the requested price. If, for example, three units are required, then the payment module communicates to vendor the hash value which is three steps back in the hash chain from the current end value $z_{m+n-p}$. The transaction module 501 at the vendor receives this hash value, checks that three further hashes result in the previous end hash value, if so stores the new end hash value in data store 504 and supplies the goods.

The client 1 maintains a pointer to the last hash value transferred, and this provides an indication of the remaining value in the coin stick. The client may make further payments to the vendor subsequently by revealing other hash values which are still further back in the hash chain.

An alternative approach to the above would be for the client to calculate $z_{m+n}$ directly rather than $z_{m+n-p}$ and communicate this to the vendor who would go through the same authorisation steps as above, before asking the client to communicate the relevant hash values further back down the chain. Although this clearly separates the authorisation from the payment phases this approach costs more messages.

The vendor may collect the money owed to it at any time by communicating the last revealed hash value to the broker's settlement interface at an address $URL_S$. The broker will require the vendor to identify themselves with a digital certificate before settling the account.

At a later stage, the vendor may wish to make a refund to the client 1, for example because one of the pages returned in response to the initial transaction was corrupted and unreadable. To effect this, the transaction module 501 communicates to the broker 6 the identity i of the relevant coin stick and the number of units of denomination, say two, which are to be refunded. The broker then recalls from the store 605 data on the relevant coin stick including the call-back interface of the vendor, $URL_C$. The broker reads the hash value $z_{m-2}$ which is two steps back in the hash chain from the value $z_m$ which was originally communicated to the client. To provide security against the user spoofing a request for a refund, the broker disconnects from the vendor and re-connects to $URL_C$ to check the refund requirement is valid. The vendor then signals to the client 1 that the refund is available. The broker stores the fact that now the vendor is entitled to settle for two less units than originally contracted in the same way that any partial settlement would be recorded. The client then accesses the URL of the coin stick issue module 601, and receives from the broker the new hash value $z_{m-2}$. The client payment application then resets its pointer to indicate that it has two additional denomination units of value remaining in the coin stick i. The broker resets its respective pointer to m−2.

The procedure described above, in which the broker issues a new secret number to the client from further back in the original chain of hash functions, may also be used by the broker to top-up a previously issued coin stick, in return for a further payment received from the client. Such an arrangement has the advantage, by comparison with the issuing of a new coin stick, that a new digitally signed contract with the client is not required, and the processing and communication overheads associated with a new contract are avoided.

In implementing the transaction system outlined above, the broker and the client may compute once and then store all the values in the hash chain. Alternatively, only the initial values in the chains may be stored, and the repeated hash functions may then be computed each time a specific value in the hash chain is needed for a transaction. It is preferred however to adopt a comprise between these two approaches in order to optimise the costs in computation and storage overheads. To this end, all the hash values in the chain are calculated initially. The client and the broker then each store only every yth value ($z_y, z_{2y}, z_{3y} \ldots$). Then fewer values have to be stored, and fewer calculations of the hash function are required compared to schemes in which the entire chain is calculated from scratch for each transaction.

Although in the example above, all the transactions are carried out on-line, this need not be the case. For example, the user might take a smart card to the user's bank, acting as the broker. The coin stick data may then be loaded directly in the memory of the smart card from a card reading/writing terminal connected to the platform which supports the broker modules. Similarly, the transactions with the vendor might be carried out between the user's smart card and an EPOS (electronic point of sale) terminal. In this case, the client functions are implemented on a smart card, the vendor functions are implemented in an EPOS, and the function performed by the Internet in the first example is replaced by the internal connections of the EPOS. In other respects, the system operates as described in the first example.

Although in the example above, the interfaces to the functions offered by each party are characterised by URLs that invoke processes through the CGI, these services may be offered by any invocation mechanism such as remote procedure call to object interfaces, either over Internet protocols or other more proprietary communications systems. In this case, the Web browser might be replaced by a specialist client module.

In the example above, the broker is characterised as a single party. Alternatively the user could interact with one broker and the vendor with another; each broker communicating with the other, for example, through a traditional electronic funds transfer system.

The efficiency of the system for the user can be further improved by issuing a bundle of coin sticks in different denominations (e.g. 0.1p, 1p, 10p, £1). These may be distinguished by different starting numbers, and/or by different hash functions, preferably by both. In this case the broker generates a number of hash chains, one for each denomination, and issues an intermediate value from each chain to the user, together with data which identifies the relevant denomination. The user then makes payments by calling off values from the different hash chains in the most efficient combinations.

Another feature of the present implementation is that it allows the user to switch between vendors with a partially used coin stick.

There are three ways for the user to switch their coin stick from vendor M1 to trade with another vendor, M2, but in all cases the bank won't authorise M2 to use the coin stick until it has been told the current length of the coin stick and been able to limit its contract with Ml to this new value. The three ways are: (1) the user could indicate to vendor M1 that they wished to stop using the stick with that vendor, asking the vendor to hand shared knowledge of the stick length back to the bank.

(2) the user could simply approach vendor M2 and make it their responsibility to get the appropriate acknowledgement from vendor M1 via the bank.

(3) the user could approach the bank who would have to get vendor M1's acknowledgement.

Although the second case seems to be the most complex, involving M2 unnecessarily, it is the preferred approach This is because it can be combined with M2's authorisation request. It also doesn't require the user to remember where they last used the stick nor which bank they bought the stick from (although this latter information is in the stick, there is no need for the user's software to be able to read it or know the bank's authorisation interface protocols).

In both the second and third cases the bank has to contact vendor M1 rather than the other way round. If either is the one implemented, the previously described protocol between the vendor and the bank is modified by adding the vendor's interface (for sending a stop message) to the information sent to the bank.

Taking the second case, the user would approach vendor M2 just as if their coin stick was freshly bought from the bank. However, when vendor M2 approached the bank for authorisation, the bank would recognise there was a preexisting contract covering that stick with a different vendor, M1. The bank would send a stop message to vendor, M1's appropriate interface and await a reply confirming the last hash value to have been sent by the user. The bank would then confirm its contract to settle was now limited to the balance up to the current length of the stick. Only on acknowledgement of this would a new contract then be sent to vendor M2, preventing the double use of any coins. Alternatively a request to settle from vendor M1 would accompany the reply from vendor M1.

It should be noted that the user gains all round from the ability to switch vendors, but bears none of the cost. For instance, the bank may charge a fee for settlement, which would discourage vendors from allowing users to switch vendors after only running up a small account. It is therefore likely that vendors would pass on the barrier of this minimum fee to the user by charging a minimum fee themselves for their service. Because this itself introduces a barrier to the use of micropayments, a far more likely solution would be for a vendor not to pass on this minimum payment barrier to its users, but instead to aggregate all the small payments from many users until they were economic to redeem from the bank.

In all cases, vendor M1 has to be willing to relinquish their hold on the user's account (coin stick) by acknowledging they have received the message warning them not to accept further coins, before the bank can authorise another vendor to use the stick. Therefore, if the user wishes to have this flexibility, she must ensure the original contract with vendor M1 includes such an undertaking.

The distributed failure modes here are potentially difficult, as it is necessary to avoid creating a distributed two phase commit. However, the above series of messages is fail-safe.

The present embodiment uses a further fourth alternative based on the second alternative described above. The contract between vendor and bank stipulates that, if at any time the vendor's call-back interface, $URL_C$, had been off-line, the vendor would be liable for any losses caused by accepting hash value coins in exchange for goods without first checking with the bank that there had not been an attempt to send a stop message by the bank during the down-time. In other words, because it is most likely that when the vendor's callback interface is down their sales interface is also down, after a period of down-time it becomes the vendor's responsibility to request any messages queued for the call-back interface and process them before accepting requests on the sales interface. In the event that the call-back interface alone went down, the vendor would take the risk if they wished to continue accepting sales.

This is preferred because the user can switch to M2 at any time, whether M1 is on-line or not. Normally a live acknowledgement from M1 would be expected, but if it became obvious this was not going to be received (e.g. after a time-out), the bank would simply queue the message for M1 and allow the switch to proceed knowing the risk was with M1. This does open the vendor to a denial of service attack on their call-back interface while the user switches to another vendor and simultaneously continues to purchase goods from the first vendor, but as already stated, if the vendor can detect the denial of service on its call-back interface, it simply has to shut down its sales interface.

If the user wished to cash in their coin stick with the bank (in part or whole), it would be identical to the situation above where the user wished to switch vendors, but with the bank taking the dual role of bank and vendor M2. In this case the cashier or cash machine would be like vendor M2 selling cash as its service, while the bank role would do the communication with M1 to transfer the coin stick account to the cashing service.

The ability to switch vendors with a part-used stick may also advantageously be implemented in otherwise conventional coin-stick payment systems.

What is claimed is:

1. A method of operating a digital payment transaction system comprising:
   a) at a first party, generating a secret number;
   b) storing at the first party the secret number;
   c) generating at the first party a first hash chain of values which are derived from the secret number by successive operations of a hash function;
   d) communicating to a second party a digitally encoded value from the chain of hash values subsequent to the first value;
   e) generating at the second party a second hash chain of values which are derived from the value communicated by the first party in step (d);
   f) communicating digitally encoded values from said second hash chain to a third party in payment; and
   g) subsequently communicating to the second party from the first party a monetary value represented by a value in said hash chain which precedes the value originally communicated in step (d).

2. A method as in claim 1, in which at least two of the first, second and third parties are located remotely from each other, and digitally encoded hash values are communicated between the parties via a communications network which links the parties.

3. A method as in claim 2, in which the communications network uses Internet protocols.

4. A method as in claim 1, in which the payment transaction system is a pre-paid system in which, in step (d), the value from the hash chain is issued in return for payment by the second party to the first party.

5. A method as in claim 1 in which the first party and or the second party initially compute the values in the hash chain and store some only of the hash values.

6. A payment server for use in a method as in claim 1 and comprising:
   a) means for generating a secret number
   b) a store for storing the secret number
   c) means for communicating the secret number or a number derived therefrom to a second party;
   d) means for validating a digitally encoded value received at the payment server from a third party when the digitally encoded value corresponds to a value in a hash chain derived from said secret number; and
   e) means responsive to said means for validating for transferring monetary value to the third party.

7. A computer program or suite of computer programs arranged to cause a computer or computers to carry out the method of claim 1.

8. A method as in claim 1, in which the second party, prior to initially communicating a hash value to the third party, calculates the number of hash values required for payment to the third party, and subsequently, in step (f) communicates to the third party the hash value which is located at the end of the second chain of hash values after the deduction from said second chain of hash values of said number of hash values.

9. A method as in claim 1, including issuing to a user a plurality of different chains corresponding to different monetary denominations.

10. A method as in claim 1, in which the second party selects the third party from a multiplicity of potential vendors.

11. A method as in claim 10 in which, after selecting the third party and communicating one or more digitally encoded values to the third party, the user subsequently selects another one of the multiplicity of vendors and communicates one or more further values from the hash chains generated in step (e) to said other one of the multiplicity of potential vendors.

12. A method as in claim 1 wherein a user can obtain a plurality of different hash chains corresponding to different monetary denominations.

13. A method as in claim 1, in which a user communicates with a first broker, and a vendor communicates with a second broker, the method further comprising exchanging validation messages between the first and second brokers.

14. A method as in claim 13, in which the validation messages are passed between the first and second brokers via a clearing system, which clearing system also transfers money between the first and second brokers.

15. A computer program or suite of computer programs arranged to enable a computer or computers to provide the apparatus of claim 14.

16. A method as in claim 1, in which step (g) is carried out in response to a request from the third party to the first party, and thereby refunds value to the second party.

17. A method as in claim 1, in which step (g) is carried out in response to a request from the second party to the first party and in return for payment from the second party to the first party.

18. A method of operating a digital payment transaction system comprising:
   a) generating a secret number;
   b) generating a first hash chain of values which are derived from the secret number by successive operations of a hash function;
   c) communicating to a first party a digitally encoded value from the chain of hash values subsequent to the first value so as to enable the first party to generate a second hash chain of values derived from the communicated value, said second hash chain of values providing means for payment from the first party to a second party; and
   d) subsequently transmitting to the first party a monetary value represented by a value in said hash chain which precedes the value originally communicated in step (c) for generating a third hash chain of values so as to provide further means for payment from the first party to the second or other parties.

19. A method as in claim 18, further comprising:
   subsequently selecting a further party from a multiplicity of potential vendors and communicating one or more further values from the hash chain generated in step (d) to said further party.

20. A method as in claim 19, in which said further party is responsible for transmitting a request, in relation to said one or more further values, to transfer from the second party to said other one of the multiplicity of vendors a liability of the first party for payment.

21. A method as in claim 19 which the second party is out of communication for a period of time, and the second party, after subsequently re-establishing communication, checks to determine whether liability for payment has been transferred to another of the multiplicity of vendors.

22. A computer program or suite of computer programs arranged to cause a computer or computers to carry out the method of claim 18.

23. A payment server for use in a digital payment transaction system, said server comprising:
   a) means for generating a secret number;
   b) means for generating a first chain of hash values which are derived from the secret number by successive operations of a hash function;
   c) communication means for communicating to a first party a digitally encoded value from the chain of hash values subsequent to the first value so as to enable the first party to generate a second hash chain of values derived from the communicated value, said second hash chain of values providing means for payment from the first party to a second party;
   d) transmitting means for subsequently transmitting to the first party a monetary value representing a value in said hash chain which precedes the value originally communicated in step (c) for generating a third hash chain of values so as to provide further means for payment from the first party to the second or other parties.

24. A computer program or suite of computer programs arranged to enable a computer or computers to provide the apparatus of claim 23.

25. A method of generating and supplying an electronic coin stick to which value can subsequently be added, said method comprising:
   generating a hash chain of n successive values extending from a value located at a proximal position in the chain with respect to a generating number towards distal positions in the chain with respect to said generating number;
   transmitting from an issuing party to a user party data representing a first distal subset of m successive ones of said values associated with a first assigned monetary value for an issued electronic coin stick, m being less than n; and
   subsequently transmitting to said second user party data representing a second distal subset of r successive ones of said values, said second distal subset being proximally located with respect to said first distal subset and being associated with a second assigned monetary value for adding value to said earlier issued electronic coin stick, r also being less than n and less than m.

26. A method as in claim 25 wherein:
   said hash chain comprises values $N_1$ through $N_n$;
   said first distal subset comprises values $N_{n-m}$ through $N_n$; and
   said second distal subset comprises values $N_{n-m-r-1}$ through $N_{n-m-1}$.

* * * * *